March 29, 1949.   O. G. LANDSVERK ET AL   2,465,886
ELECTRICAL MEASURING APPARATUS
Filed Oct. 21, 1946                 2 Sheets-Sheet 1
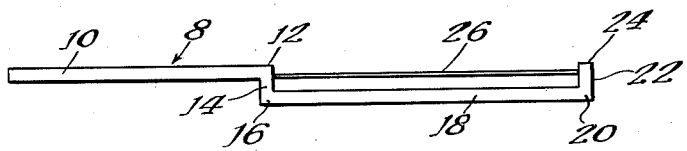
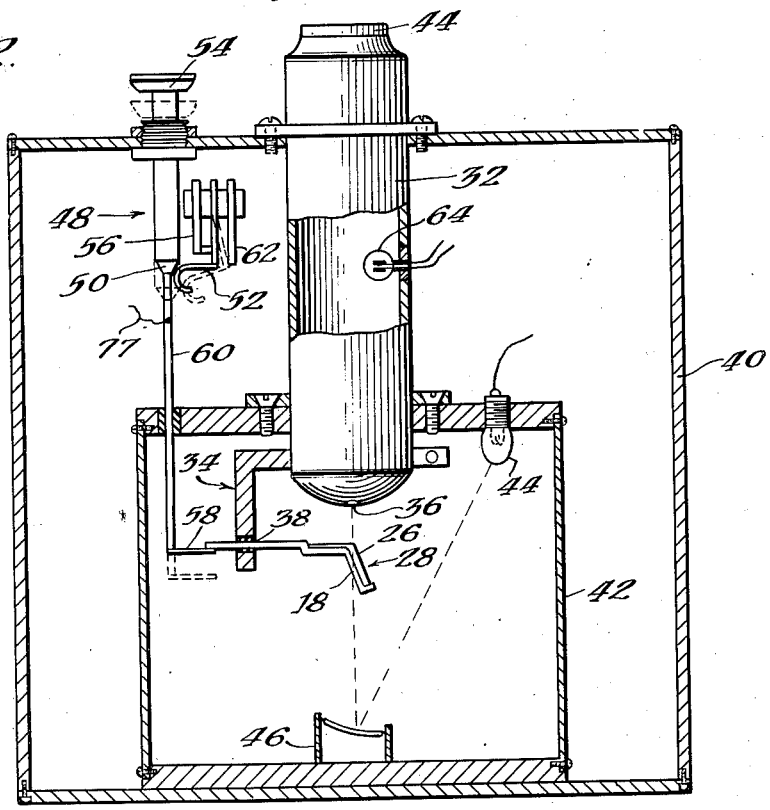
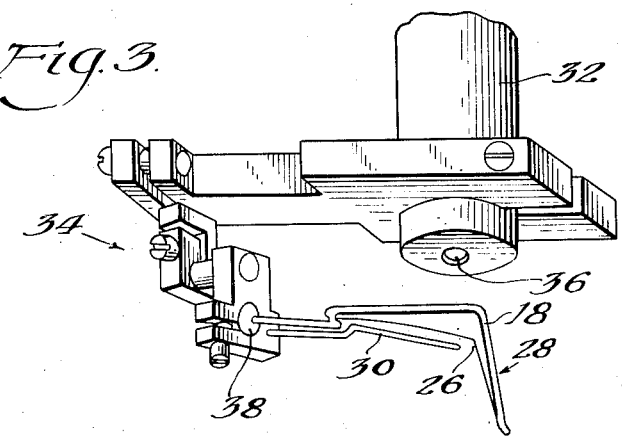
INVENTOR.
Ole G. Landsverk
Ernest O. Wollan
BY
Robert A. Lavender
Attorney March 29, 1949. O. G. LANDSVERK ET AL 2,465,886
ELECTRICAL MEASURING APPARATUS
Filed Oct. 21, 1946 2 Sheets-Sheet 2
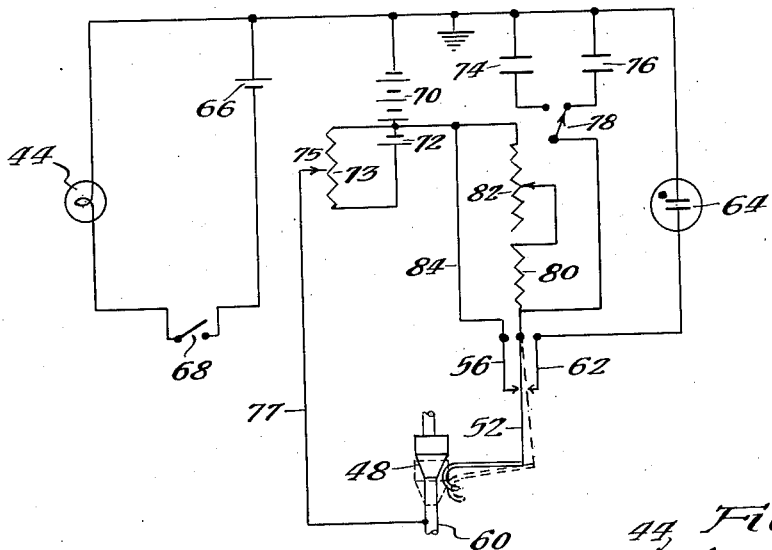
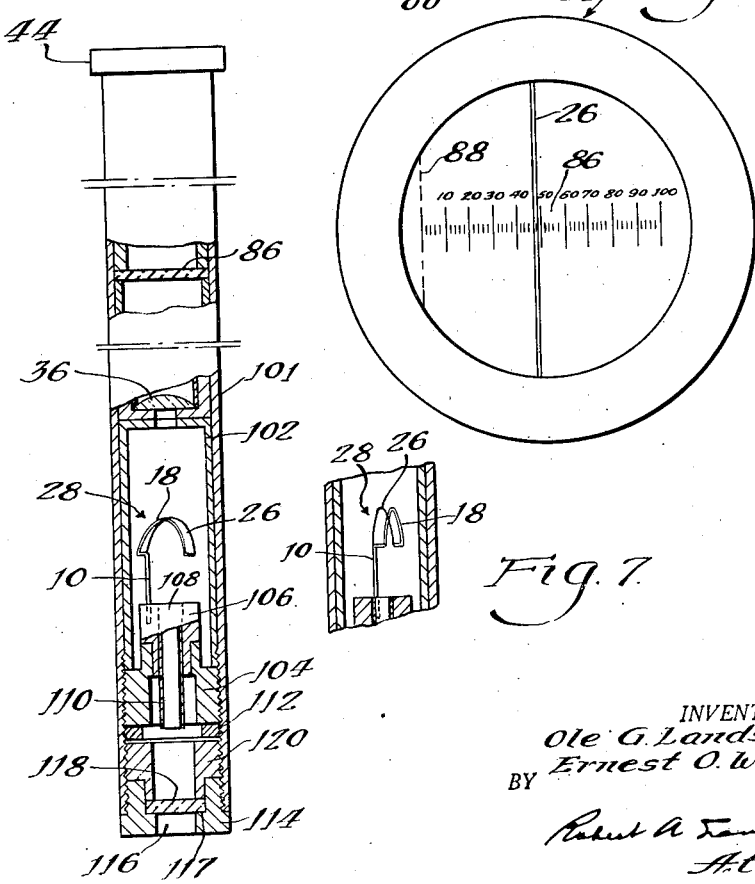
INVENTOR.
Ole G. Landsverk
Ernest O. Wollen
BY
Robert A. [Attorney]
Attorney Patented Mar. 29, 1949

2,465,886

UNITED STATES PATENT OFFICE 2,465,886

ELECTRICAL MEASURING APPARATUS

Ole G. Landsverk, Chicago, Ill., and Ernest O. Wollan, Oak Ridge, Tenn., assignors to the United States of America as represented by the United States Atomic Energy Commission Application October 21, 1946, Serial No. 704,782

8 Claims. (Cl. 250—83.3)

This invention relates to an improved electroscope for use in portable instruments for the measurement of radioactivity.

The measurement of radioactivity is commonly accomplished by measuring the ionization caused by the charged particles, such as alpha and beta particles, emitted by radioactive substances or by measuring the ionization caused by charged particles secondarily induced by uncharged radioactive emanations such as gamma rays. One device for making such measurements of ionization is the electroscope.

The operation of the electroscope is based upon the well-known fact that electrostatic charges of the same polarity exert a mutual repulsive force. In the electroscope, two conducting elements, at least one of which is free to move in accordance with an applied force, are charged to the same potential. The charges thus induced set up a repulsive force. There is likewise present a restoring force. Equilibrium is established when the repulsive and the restoring forces are equal.

In the familiar gold leaf electroscope the restoring force is the force exerted by gravity. In the normal position, i. e., the uncharged position, the two gold leaves are vertical and adjacent to each other, being fastened together and supported at the top. The degree of spreading which occurs when the system is charged constitutes a measure of the charge placed upon the system. If ionization of the surrounding medium, commonly air, occurs in the region near the electroscope, the electroscope captures charges of the polarity opposite to that with which it is charged. Thus part of the charge is neutralized and the angle of spread between the leaves is decreased.

By charging the electroscope to a standard angle of spread and measuring the decrease in the angle of spread over a fixed period of time, the ionization in the surrounding region may be measured, as is well-known in the art.

The angle of spread of the electroscope may thus be calibrated in terms of the radioactivity to which the region surrounding the electroscope is exposed for fixed times of exposure after charging. Alternatively, the time of exposure may be calibrated for a fixed change in the angle of spread.

The gold leaf electroscope is not suitable for portable instruments because of its delicacy and the fact that since the restoring force is the force exerted by gravity the instrument must be vertical or the calibration will not hold true.

The most satisfactory electroscope for portable use devised before this invention is the quartz-fiber electroscope, commonly called the Lauritsen electroscope. In this device a flexible quartz fiber is supported parallel and adjacent to a rigid wire or "support rod," which supports the fiber at one end, the other end being free. The quartz fiber is coated with a conducting substance such as platinum. When the system is charged the free end of the quartz fiber bends away from the support rod, the bending thus constituting a measuring of the charge. The restoring force is the resilience of the quartz fiber itself, since the quartz fiber has negligible weight. Calibration of the instrument is relatively independent of the position in which the instrument is held. Great difficulty is, however, experienced with instability. The quartz fiber may become wrapped around the support rod and thus render the instrument unusable. In measuring radioactivity, the electroscope fiber is commonly viewed with a microscope, and a stop-watch is used for measuring the time of discharge.

It is an object of the present invention to provide an electroscope which is stable, rugged, and reliable, yet sensitive in operation.

It is a further object of this invention to provide a portable instrument for the measurement of radioactivity in which the electroscope is charged and in which the rate of discharge of the electroscope is observed through a microscope and a visual indication of the elapsed time since the commencement of discharge is observed in the field of the microscope.

It is a further object of the invention to provide an instrument adapted to be carried in the pockets of workers who deal with radioactive substances, which instrument may be charged, for example, at the commencement of the work day and may be inspected from time to time during the work day to determine the total amount of radioactivity to which the worker has been exposed.

For understanding of the invention reference is made to the drawing in which:

Figure 1 is a side elevation of a basic assembly from which an electroscope may be fabricated;

Figure 2 is a schematic cross-sectional view, partly in elevation, of a portable instrument for the measurement of radioactivity;

Figure 3 is a perspective view of an electroscope which is one element of the instrument illustrated in Figure 2, together with an electroscope mounting;

Figure 4 is a schematic electrical diagram of the instrument illustrated in Figure 2;

Figure 5 is a pictorial view of the field appearing in the eye-piece of the microscope which is one of the elements of the instrument illustrated in Figure 2;

Figure 6 is a cross-sectional view, partly in elevation, of a pocket instrument for the measurement of radioactivity; and Figure 7 is a fragmentary cross-sectional view of the instrument illustrated in Figure 6, rotated to show the detail of the electroscope which is one of the elements of the instrument illustrated in Figure 6.

Referring first to Figure 1, the support rod 8 is, for example, a phosphor bronze wire of 30 mil. diameter. The support rod 8 has, in succession, a straight portion 10, a right angle bend 12, a support segment 14, a second right angle bend 16, a portion 18 hereinafter described and hereinafter called the repelling portion, a further right angle bend 20 and a second support segment 22 parallel to the support segment 14. Between the right angle bend 12 and the end 24 of the support segment 22, parallel to the repelling portion 18, is a quartz fiber 26 of, for example, 3 to 10 microns diameter, fastened at each end by a drop of cement. The length of the repelling portion 18 and the quartz fiber 26 is, for example, 14 to 60 millimeters. The length of the support segments 14 and 22 is, for example, one-half to one and one-half millimeters.

The assembly illustrated in Figure 1 is the basic assembly from which the electroscope, generally designated by the numeral 28 in Figures 2, 3, 6, and 7, is fabricated. It will be seen that, as illustrated in Figure 1, there is no freedom of motion between the quartz fiber 26 and the repelling segment 18. Therefore, as illustrated in Figures 2, 3, 6, and 7, the repelling portion 18 and the fiber 26 are bent in a direction normal to the plane of the drawing of Figure 1. In Figure 3 this bending is in the form of an L, the bend appearing at approximately the mid-point of the repelling portion 18 and the quartz fiber 26. In Figures 6 and 7 the bending of the repelling portion 18 and the fiber 26 is in the form of a bow or a portion of an ellipse. In either case it may be seen that the central portion of the fiber 26 may now move in accordance with a repulsive force between the fiber 26 and the repelling portion 18. It may be further seen that the fiber 26 cannot become wrapped around the repelling portion 18. The fiber 26 is coated with a conducting coating, for example, sputtered platinum. It will be understood that the teachings of this invention may be applied to other types of fibers, such as thin plantinum wires.

In the embodiment of Figure 3 there is added a supplemental ground rod 30 which is approximately parallel to the fiber 26 and the repelling portion 18 so that the fiber 26 is between the repelling portion 18 of the electroscope 28 and the ground rod 30. Thus when the electroscope 28 is charged there is exerted on the fiber 26 an attractive force by the ground rod 30 in addition to the repulsive force exerted by the repelling portion 18. In this manner the sensitivity of the instrument is increased without sacrificing stability. Preferably, the plane of the ground rod 30 is slightly skew to the plane of the repelling portion 18, so that the ground rod 30 is approximately parallel to the fiber 26 when the electroscope 28 is fully charged.

As illustrated in Figure 3 the electroscope 28 is mounted upon a microscope 32 by a support generally designated by the numeral 34. The support 34 permits adjustment of the position of the electroscope 28 in all directions with respect to the objective lens 36 of the microscope 32. Thus adjustment may be made so that the fiber 26 appears within the field of the microscope 32 over any desired range of voltages impressed upon the electroscope 28. The electroscope 28 is insulated from the support 34 by a polystyrene insulator 38. The support 34 comprises no part of the present invention and is therefore not further described herein.

Referring now to Figure 2 the portable instrument therein illustrated is enclosed in a housing 40 of a conducting material such as sheet metal. Within the housing 40 is an ionization chamber 42. A microscope 32 with a magnification of, for example, 100 to 150, extends from the exterior of the housing 40 into the interior of the ionization chamber 42. The eyepiece 44 of the microscope 32 is adapted to be viewed from the outside of the instrument. A support 34, preferably of the construction illustrated in Figure 3, supports the electroscope 28 within the ionization chamber 42; the microscope 32 is foscussed upon the fiber 26. The microscope 32 contains a calibrated scale in the focal plane of the objective lens 36 in the manner well-known in the art. Inserted in the wall of the ionization chamber 42 is a flashlight bulb 44. Mounted within the ionization chamber 42 is a concave mirror 46 adapted to reflect the light from the flashlight bulb 44 onto the fiber 26 and into the objective lens 36. Extending through the top of the housing 40 is a push button switch generally designated by the numeral 48. The switch has a non-conducting tapered portion 50, for example of Bakelite, adapted to move a spring armature 52 when the exterior button 54 is depressed. In the normal (raised) position of the switch 48 the spring armature 52 makes contact with the contact 56. A contact 58 which is coupled to the tapered portion 50 of the switch 48 by a conducting shaft 60 makes contact with the electroscope 28 when the switch is in the normal position. When the switch button 54 is depressed, as indicated by the dotted lines in the drawing, the contact between the spring armature 52 and the contact 56 is broken and contact is made between spring armature 52 and a second contact 62. Likewise the contact between the shaft 60 and the electroscope 28 is opened. A neon bulb or glow tube 64 is mounted within the barrel of the microscope 32 at one side thereof, so that the glow tube 64 itself does not appear in the field of view, but its glow is so visible.

Operation of the device illustrated in Figure 2 will be better understood by reference to the schematic circuit diagram of Figure 4. It will be noted that many of the elements illustrated in Figure 4 do not appear in the illustration of Figure 2. It will be understood that the housing 40 of Figure 2 contains all of the elements of the circuit of Figure 4, but, for purposes of clarity in explaining the invention, only certain ones of these elements appear in Figure 2, the mounting of such elements as resistors, condensers or batteries being so well-known in the art as not to require illustration in the drawing.

In Figure 4 the flashlight bulb 44 is supplied with power by a flashlight battery 66 in series with a switch 68, the switch 68 serving to turn on the flashlight bulb 44. A battery 70, for example 90 volts, is connected in series aiding with another battery 72, for example 45 volts, across which battery 72 is a potentiometer 73 for example 10 megohms. The tap 75 on the potentiometer 73 is connected to the shaft 60 of the switch 48 by a wire 77 soldered to the shaft 60. Thus the potential between the housing 40, which is connected to the negative terminal of the battery 70, and the shaft 60, which constitutes the electroscope charging potential, is the sum of the potential of battery 70 and the potential appearing across a portion of the potentiometer 73. This electroscope charging potential, for example 125 volts, may be adjusted by adjustment of the tap 75. In series with the battery 70 is a condenser 74 or 76, a fixed resistor 80 and a rheostat 82. When the switch 48 is in the raised position the resistor 80 and the rheostat 82 are shorted out by a shorting wire 84 which is connected to the contact 56 of the switch 48. The spring armature 52 of the switch 48 is connected to the switch 78 the position of which determines whether condenser 74 or condenser 76 is connected into the circuit. In the normal position, then, the electroscope 28 is charged to the charging potential and the condenser 74 or 76 is charged to the potential of the battery 70.

When the switch 48 is changed to the depressed position by pressure on the button 54 the spring armature 52 connects the switch 78 and thus the condenser 74 or 76 to the neon bulb 64. The condenser 74 or 76 discharges through the neon bulb 64, the potential of the battery 70 being greater than the flashing potential of the neon bulb 64. Likewise the short-circuit across the resistor 80 and the rheostat 82 is opened by the motion of the armature 52 so that the condenser 74 or 76 is recharged through resistor 80 and rheostat 82. The recharging, as is well-known in the art, continues until the condenser 76 or 74 is again charged to the flashing potential of the neon bulb 64, at which time neon bulb 64 again flashes. The time between the first flash of the bulb, which occurs when the switch 48 is depressed, and the second flash of the bulb, is a function of the time constant of the condenser 74 or 76 charging through the resistor 80 and the rheostat 82. During this time the electroscope 28 is discharging at a rate dependent upon the amount of ionization occurring in the chamber 42 as a result of the radioactivity under measurement.

The microscope 32 contains a calibrated scale 86, as illustrated in Figure 5. The adjustment of the tap 75 on the potentiometer 73 is made so that the repulsive force between the repelling portion 18 and the fiber 26 of the electroscope 28 brings the fiber 26 to zero on the calibrated microscope scale as indicated by the dotted line 88 in Figure 5, when the switch 48 is in the raised position. When the switch 48 is depressed and the electroscope 28 begins to discharge, the repulsive force between the fiber 26 and the repelling portion 18 diminishes at a rate dependent upon the radioactivity to which the chamber 42 is exposed. As stated before the neon bulb 64 likewise flashes upon depressing of the switch 48. The shadow of the fiber 26 is then seen through the eye-piece 44 to move across the scale 86. After a fixed time dependent upon the rate of charging of the condenser 74 or 76 the neon bulb again flashes and the position of the fiber 26 on the scale 86 is observed and constitutes a measure of the radioactivity under measurement. The button 54 is then released and the instrument is ready for another measurement.

The time constant with which the condenser 74 or 76 is charged may be adjusted by adjustment of the rheostat 82 so as to give any desired correspondence between full-scale reading over the period between flashes of the bulb 64 and the incident radioactivity. For example, the rheostat may be adjusted so that if the fiber 26 moves from zero to 100 on the scale 86 in the period between the depressing of the switch 48 and the second flashing of the bulb 64 there is indicated a gamma ray intensity of 12½ mr. per hour, which is a currently accepted tolerance for humans exposed to such radiation every day.

If the condenser 76 is sufficiently greater in capacitance than the condenser 74 so that the time between flashings of the neon bulb 64 is, for example, 10 times as great with the switch 78 connected to the condenser 76 than it is with the switch 78 connected to the condenser 74, the sensitivity of the instrument is increased by a factor of 10. As an example, suppose that the calibration is made so that with the condenser 74 connected, the fiber 26 drifts from its zero position 88 to full-scale (a reading of 100 on the scale 86 illustrated in Figure 5) during a 10-second period between the flashings of neon bulb 64, when the incident radiation is of an intensity of 125 mr. per hour. Then if the condenser 76 is connected in place of the condenser 74 and is of such capacitance as to make the time of measurement 100 seconds, a drift of the fiber 26 from its zero position 88 to full-scale over the period so indicated would represent an intensity of 12½ mr. per hour.

The use of the neon bulb 64 and its associated circuit, as illustrated in Figure 4, the bulb 64 being mounted in the microscope 32 as illustrated in Figure 2, obviates the necessity of using a stop-watch for the time measurement as has heretofore been the common practice and further obviates the necessity of the operator's looking back and forth between the eyepiece and the stop water, which has heretofore been required.

In Figure 6, there is illustrated another instrument embodying the electroscope 28 which constitutes a portion of this invention. In Figure 6 a tubular housing 101, for example of aluminum, has mounted therein a conducting thimble 102, for example of a graphite-lucite mixture, the thimble 102 constituting the outer electrode of an ionization chamber of which the electroscope 28 constitutes the inner electrode. A polystyrene insulator 104 is mounted near one end of the housing 101. Supported on the polystyrene insulator 104 is a conducting collar 106 preferably of a graphite-lucite mixture and preferably moulded integrally with the polystyrene insulator 104. The electroscope is mounted on the collar 106, preferably by moulding of the straight portion 10 therein. The collar 106 has an aperture 108 axially thereof and has a tube 110, for example of copper, fastened into the aperture and extending downward beyond the end of the insulator 104. A lock-nut 112, externally threaded to match the internal threading of the bottom portion of the housing 101, locks the insulator 104 and the electroscope 28 into position. At the lower end of the housing 101 is an externally threaded cap 114 having an aperture 116 centrally thereof and having a shoulder portion 117 adapted to sandwich a celluloid disc 118 between the shoulder portion 117 and a spacer 120 which in turn rests against the lock-nut 112.

The upper portion of the housing 101 contains a standard microscope lens system comprising an objective lens 36 and an eye-piece 44 focussing upon the fiber 26 of the electroscope 28. The calibrated scale 86 is interposed in the focal plane of the objective lens 36. When the instrument is directed toward a light source, such as an electric light bulb, light enters through the aperture 116 and the disc 118, thence through the tube 110, onto the fiber 26 and the objective lens 36. The position of the fiber 26 is thus made visible through the eye-piece 44 in the manner illustrated in Figure 5 and described above.

The instrument illustrated in Figure 6 is suitable to be carried in the pocket of a laboratory worker dealing with radioactive materials. To prepare the instrument for operation the end cap 114 is unscrewed and the electroscope 28 charged by applying a potential between the tube 110 and the housing 101. The external charging source (not illustrated) is adjusted in voltage so that the fiber 26 is brought to the zero position 88 on the scale 86 when viewed through the eye-piece 44. The end cap 114 is then replaced. The worker may, by holding the instrument up to the light at any time, determine the total radiation to which he has been exposed since the charging of the meter. It is necessary, of course, that the leakage resistance of the insulator 104 be kept very high, since leakage across this insulator will produce a discharge of the electroscope 28, which is indistinguishable from the discharge caused by the ionization induced by the radioactivity under measurement. The most satisfactory method for producing sufficiently high insulation resistance for this purpose is the moulding of the insulator 104 into the proper shape. Such a method of fabrication has been found to produce leakage characteristics far superior to those of insulators made by machining and polishing, particularly under conditions of high ambient relative humidity. With proper care, the instrument will have negligible error due to leakage over a period of a number of days.

It will be understood that the teachings of this invention are not limited to the embodiments disclosed in the drawing and described above. Persons skilled in the art will readily find equivalent means for applying the teachings of the invention.

What is claimed is:

1. An electroscope comprising, in combination, a supporting conducting wire having at least a portion thereof bent to define a plane, a wire-like conducting fiber having at least a portion thereof of a shape substantially the same as that of said portion of the supporting wire and defining a second plane, means for supporting said portion of said fiber substantially parallel to said portion of said wire in a plane spatially separated from the plane of said wire, said supporting means being adapted to retain rigidly the ends of said portion of said fiber in fixed spatial relationship to said wire but to permit the central part of said portion to vary in distance from said wire in response to an applied force, and means for maintaining the wire and the fiber at the same electrical potential.

2. An electroscope having a rigid conducting portion bent to define a plane, a conducting fiber adjacent thereto adapted to be flexed by a repulsive electrostatic force and having two ends and means for maintaining said rigid portion and said fiber at the same electrical potential, wherein said fiber is bent to define a plane and is rigidly mounted at both ends thereof substantially parallel to said rigid portion.

3. An electroscope comprising, in combination: (1) a conducting wire having in succession a first straight portion, a right-angle bend, a second straight portion, perpendicular to the first straight portion, a second right-angle bend, a bent portion in a plane perpendicular to said second straight portion, a third right-angle bend and a third straight portion perpendicular to said bent portion and parallel to said second straight portion, the lengths of said second straight portion and said third straight portion being small relative to the length of said bent portion; (2) a conducting fiber of a length and shape substantially the same as the length and shape of the bent portion of the wire and having two ends; and (3) means for rigidly attaching one end of said fiber to the junction between the first straight portion and the second straight portion of the wire and means for rigidly attaching the other end of the fiber to a point on the third straight portion of the wire such that the fiber is substantially parallel to the bent portion of the wire.

4. Electroscope apparatus comprising, in combination, a rigid conductor, a flexible conducting fiber adjacent said rigid conductor, means for maintaining said rigid conductor and said fiber at the same electrical potential, a rigid wire, means for mounting said rigid wire substantially parallel to said fiber and spaced apart therefrom in a direction opposite to the rigid conductor, and means for maintaining said rigid wire at a substantially fixed electrical potential.

5. Microscope apparatus comprising, in combination, a microscope having a lens system comprising an objective lens and an eyepiece, and timing means having an indicator adapted to indicate visually the passage of a fixed elapsed time after actuation of the timing means, said visual indicator being adjacent the lens system so as to be visible through said eyepiece upon the expiration of said elapsed time.

6. Microscope apparatus comprising, in combination, a microscope having a lens system comprising an objective lens and an eyepiece, a light source adapted to be flashed, and timing means for flashing said light source upon the expiration of an elapsed time after actuation of the timing means, said light source being adjacent the lens system so that the flash is visible through said eyepiece.

7. Microscope apparatus comprising, in combination, a microscope having an objective lens, an eyepiece and a barrel, a light source adapted to be flashed, means for mounting said light source within said barrel in a manner adapted to prevent visibility of the light source through the eyepiece but to permit visibility of light emanating from the light source through the eyepiece, and timing means for flashing said light source after a predetermined interval of time after actuation of the timing means.

8. Apparatus for the measurement of radioactivity comprising, in combination, an electroscope having a support rod and a fiber adapted to be flexed by an electrostatic repulsive force between said support rod and said fiber, means for supporting said electroscope, a microscope having an eyepiece and a scale in the field of view of said eyepiece adapted to measure the flexural motion of said fiber, a light source adapted to be flashed and to cast light into the field of view of said eyepiece upon being so flashed, means for supporting the microscope so as to permit viewing of the fiber and the scale through the eyepiece, timing means for flashing said light source a predetermined time interval after activation of said timing means, a source of charging potential for the electroscope, means for disconnecting said source of charging potential and thus allowing the electroscope to discharge, and means for activating the timing means contemporaneously with the disconnecting of the source of charging potential.

O. G. LANDSVERK.
ERNEST O. WOLLAN.

REFERENCES CITED

The following references are of record in the file of this patent:

UNITED STATES PATENTS

| Number | Name | Date |
| --- | --- | --- |
| 1,933,063 | Kolhorster | Oct. 31, 1933 |
| 2,022,117 | Lauritsen | Nov. 26, 1935 |
| 2,144,873 | Dimond | Jan. 24, 1939 |

FOREIGN PATENTS

| Number | Country | Date |
| --- | --- | --- |
| 615,966 | Germany | July 17, 1935 |